United States Patent [19]

Farley

[11] 4,172,032

[45] Oct. 23, 1979

[54] POLYPHOSPHATE-BASED INDUSTRIAL COOLING WATER TREATMENT

[75] Inventor: George T. Farley, Downers Grove, Ill.

[73] Assignee: Nalco Chemical Company, Oak Brook, Ill.

[21] Appl. No.: 864,119

[22] Filed: Dec. 23, 1977

Related U.S. Application Data

[63] Continuation of Ser. No. 732,569, Oct. 15, 1976, abandoned.

[51] Int. Cl.² .......................... C02B 5/04; C02B 5/06; C23F 11/12; C23F 11/18
[52] U.S. Cl. .......................................... 210/58; 210/57; 252/181; 252/389 A; 252/391; 422/13
[58] Field of Search ............. 252/89, 175, 181, 389 R, 252/391, 389 A; 210/55, 57, 58; 422/13

[56] References Cited

U.S. PATENT DOCUMENTS

| | | | |
|---|---|---|---|
| 2,742,369 | 4/1956 | Hatch | 252/391 |
| 2,941,953 | 6/1960 | Hatch | 252/389 R |
| 3,130,152 | 4/1964 | Fuchs | 252/175 |
| 3,338,670 | 8/1967 | Fuchs | 252/175 |
| 3,728,420 | 4/1973 | Stanford | 252/89 |
| 3,751,372 | 8/1973 | Zecher | 252/181 |
| 3,873,465 | 3/1975 | Di Simone | 252/181 |

*Primary Examiner*—Dennis L. Albrecht
*Attorney, Agent, or Firm*—John G. Premo; Robert A. Miller

[57] ABSTRACT

When a specific condensed phosphate glass is combined with an organic phosphate ester, an improved composition is afforded for preventing scale and corrosion in industrial cooling systems. Optionally, certain azoles are combined with the phosphate glass and phosphate ester to afford corrosion protection to non-ferrous metals.

4 Claims, No Drawings

POLYPHOSPHATE-BASED INDUSTRIAL COOLING WATER TREATMENT

This is a continuation of application Ser. No. 732,569 filed on Oct. 15, 1976 which is now abandoned.

INTRODUCTION

Condensed phosphates were first used in cooling water applications in the early 1930's. Extensive use was found for these polyphosphates because of their ability to control calcium carbonate scaling at threshold or substoichiometric dosages. Later, their ability to control the corrosion of steel in open recirculating cooling water systems and once through cooling water systems demonstrated the versatility of this class of compounds.

The use of polyphosphates began to give way to the acidchromate programs as the primary corrosion inhibitor for mild steel in open recirculating systems in the early 1960's. This preference for chromate and chromate-zinc programs is still quite prevalent today. The cause for this change stems from the one major disadvantage of polyphosphate treatments—hydrolytic instability which produces orthophosphate. The orthophosphate anion forms insoluble scales with all bivalent cations, the most important of which are calcium, magnesium and iron. These scales can foul heat transfer surfaces and reduce dramatically heat transfer efficiency of process heat exchangers. In addition to providing fouling problems, the orthophosphate anion fails to provide the positive effects of condensed phosphates. Orthophosphate does not show a threshold effect[1] nor is it as effective in corrosion prevention of steel as condensed phosphates.

[1] K. F. Reitemeier and T. F. Buehrer, J. Phys. Chem., 44 (1940) 535.

Condensed phosphates will revert to orthophosphate when dissolved in aqueous media. The kinetics of reversion may vary widely but the most important factors in determining the rate of orthophosphate production are temperature, pH, and the choice of condensed phosphate species. Control of mild steel corrosion by a cooling water treatment program based on condensed phosphate is wholly dependent on the level of performance of the particular condensed phosphate itself and the factors which affect the rate of its reversion to orthophosphate.

It is customary in the treatment of industrial cooling waters to combine inorganic polyphosphates with other materials to prevent scale and to aid in the prevention of corrosion of non-ferrous metals such as copper and copper alloys.

Useful scale inhibitors for treating industrial cooling waters are the phosphated esters of certain polyols which are described in U.S. Pat. No. 3,728,420.

In addition to using these scale inhibitors, it is oftentimes common to combine with the polyphosphates certain heterocyclic nitrogen compounds such as certain azoles which prevent corrosion of copper and copper alloys such as admiralty metal.

A typical prior art scale inhibitor that has been used in treating industrial cooling systems such as cooling tower waters and which is hereinafter referred to as Composition 2 has the following formula:

| Composition 2 | |
|---|---|
| Ingredients | % by Weight |
| Phosphated-Ethoxylated Glycerine[1] | 11.8 |
| Bensotriazole | 2.0 |
| Potassium Pyrophosphate | 21.7 |
| Alkali, Water, Alcohol | Balance |

[1] See Example 1, U.S. 3,728,420, for general mode of preparation and Composition.

In conducting laboratory studies with this material, several conclusions were reached based upon experimental data. When this material is used to treat low hardness waters, e.g. less than 70 ppm, as calcium carbonate, the corrosion rate tends to be excessive. It was further observed that when the calcium hardness, basin temperature and holding time indexes were increased, there was an inordinate increase in deposit and scale formation. This is particularly true when the temperature of the water was in excess of 110° F. and the calcium hardness was maintained at about 250 ppm. It has also been observed and based on prior known data that conventional polyphosphates, when the extreme conditions mentioned above are employed at alkaline conditions, e.g. pH 8–9, that their reversion to orthophosphate is extremely rapid, thus rendering their use as a corrosion inhibitor quite limited as well as tending to increase the scaling tendency of the system.

Based on the above, it would, therefore, be of benefit to the art if it were possible to provide an improved scale and corrosion inhibitor for industrial cooling waters which contained an inorganic polyphosphate in combination with other scale and corrosion inhibitors which could operate effectively under conditions of elevated temperature, high calcium hardness, and at a pH within the range of 8–9, to effectively prevent scale and corrosion.

THE INVENTION

The invention provides a composition for preventing scale and corrosion in industrial cooling water systems which comprises (I) a water soluble alkali metal condensed phosphate glass which has an average molecular weight of about 2160 and a $PO_4$ content of 92.4% by weight, and (II) a phosphate ester of a polyol of the formula:

$$(HO-)_x R[-O(R_1O-)_z CH_2CH_2OH]_y$$

wherein R is a saturated, hydrocarbon radical having two to six carbon atoms, $R_1$ is a member selected from the group consisting of:

$$-CH_2CH_2- \text{ and } -CH_2CH- \atop \phantom{-CH_2CH-}CH_3$$

x is a number average in the range of 0–5, inclusive, y is a number average in the range of 1–6, inclusive, and the sum of x plus y equals 2–6, and z is a number average in the range of 0–30, inclusive, with the weight ratio of I:II being within the range of 1:4 to 4:1.

In a preferred embodiment of the invention, the ratio of I:II is about 1:1. In another preferred embodiment of the invention, the compositions contain from about 3–15% by weight of an azole from the group consisting of a member selected from the group consisting of 1,2,3- triazoles, pyrazoles, imidazoles, isoxazoles, oxazoles, isothiazoles, thiazoles and mixtures thereof.

The Alkali Metal Condensed Phosphate Glass

The phosphate glass has the structural formula set forth below:

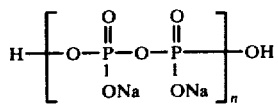

In the above formula, n is 10.5. In addition, it has an average molecular weight of 2160 and a $PO_4$ content of 92.4%. It is interesting to compare this condensed phosphate with potassium pyrophosphate which has the following structural formula:

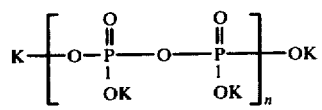

In the above formula, n equals 1, the molecular weight is 330, and the $PO_4$ content is 57.5%.

The phosphate glass is a long chain polyphosphate while pyrophosphate is the dimer of orthophosphate. The condensed phosphate in each product is responsible for the corrosion protection of mild steel. Hence, differences in mild steel corrosion rates will be directly attributable to the condensed phospate used. The basis of comparison for these molecules must be on an equal $PO_4$ content. This permits a measure of the amount of performance gained per phosphate grouping and thus the relative merits of each structure.

The Water-Soluble Phosphated Esters of Non-Surface Active Polyols

As indicated, these materials are described in U.S. Pat. No. 3,728,420, the disclosure of which is incorporated herein by reference. These esters comprise phosphate esters of a phosphated composition derived by the reaction of phosphorus pentoxide or polyphosphoric acid with a polyol composition of the formula:

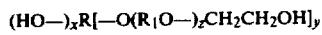

wherein R is a saturated, hydrocarbon radical having two to six carbon atoms, $R_1$ is a member selected from the group consisting of

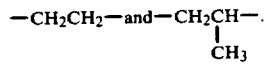

x is a number average in the range of 0–5 inclusive, y is a number average in the range of 1–6, inclusive, preferably 3–5, and the sum of x plus y equals 2–6, and z is a number average in the range of 0–30, inclusive.

Preferred embodiments include those in which said polyol is derived by oxyethylation of glycerol with 1.5 to 2.5 mols of ethylene oxide per mol of glycerol; those in which said polyol is derived by the oxyethylation of mannitol with about 2–20 mols of ethylene oxide per mol of mannitol; those in which said polyols are derived by the oxyethylation of sorbitol with about 2–20 mols of ethylene oxide per mol of sorbitol; those in which said polyol is derived by the oxyethylation of trimethylolpropane with 1.5 to 2.5 mols of ethylene oxide per mol of trimethylolpropane. Examples of these materials prior to reaction with either $P_2O_5$ or polyphosphoric acid are set forth in Table I, A, of U.S. Pat. No. 3,728,420.

Example 1 of this patent shows the preparation of an ester composition that is extremely satisfactory as a scale preventative.

The Azoles

Azoles are nitrogen containing heterocyclic 5-membered ring compounds, and azoles which are suitable in the composition of this invention include triazoles, pyrazoles, imidazoles, isoxazoles, oxazoles, isothiazoles, thiazoles and mixtures thereof as disclosed in U.S. Pat. Nos. 2,618,602; 2,742,369; and 2,941,953.

The triazoles which can be employed in the composition of this invention are any water-soluble 1,2,3-triazoles such as 1,2,3-triazole itself or a substituted 1,2,3-triazole where the substitution takes place in either the 4 or 5 position (or both) of the triazole ring as shown here by the structural formula:

Suitable triazoles include benzotriazole (the preferred triazole); 4-phenyl-1,2,3-triazole; 1,2-naphthotriazole; and 4-nitrobenzotriazole, tolyl triazole and the like.

The pyrazoles which can be used in the composition of this invention include any water-soluble pyrazoles such as pyrazole itself or a substituted pyrazole where the substitution takes place in the 3, 4, or 5 position (or several of these positions) of the pyrazole ring as shown by the structural formula:

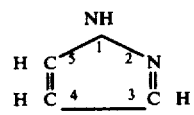

Suitable pyrazoles include pyrazole, 3,5-dimethyl pyrazole, 6-nitroindazole; 4-benzyl pyrazole; 4,5-dimethyl pyrazole, and 3-allyl pyrazole, and the like.

The imidazoles which can be used in the composition of this invention include any water-soluble imidazoles such as imidazole itself or a substituted imidazole where the substitution takes place in the 2, 4 or 5 position (or several of these positions) of the imidazole ring as shown here by the structural formula:

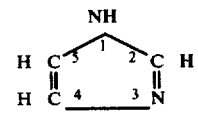

Suitable imidazoles which can be employed in the composition of this invention include imidazole; adenine, quanine, benzimidazole; 5-methyl benzimidazole; 2-phenyl imidazole, 2-benzyl imidazole, 4-allyl imidazole, 4-(betahydroxy ethyl)-imidazole, purine, 4-methyl imidazole, xanthine, hypoxanthene, 2-methyl imidazole, and the like.

Isoxazoles which can be employed in the composition of this invention include any water-soluble isoxazole such as isoxazole itself or a substituted isoxazole where the substitution takes place in the 3, 4 or 5 position (or several of these positions) of the isoxazole ring as shown here by the structural formula:

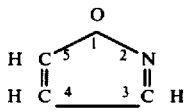

Suitable isoxazoles include isoxazole, 3-mercaptoisoxazole, 3-mercaptobenzisoxazole, benzisoxazole, and the like.

The oxazoles which can be employed in the composition of this invention include any water-soluble oxazoles such as oxazole itself or a substituted oxazole where the substitution takes place in the 2, 4 or 5 position (or several of these positions) of the oxazole ring as shown here by the structural formula:

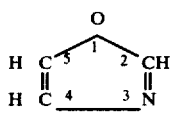

Suitable oxazoles include oxazole, 2-mercaptoxazole, 2-mercaptobenzoxazole, and the like.

The isothiazoles which can be employed in the process of this invention include any water-soluble isothiazoles such as isothiazole itself or a substituted isothiazole where the substitution takes place in either the 3, 4 or 5 position (or several of these positions) of the isothiazole ring as shown here by the structural formula:

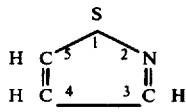

Suitable isothiazoles include isothiazole, 3-mercaptoisothiazole, 3-mercaptobenzisothiazole, benzisothiazole, and the like.

The thiazoles which can be used in the composition of this invention include any water-soluble thiazole such as thiazole itself or a substituted thiazole where the substitution takes place in the 2, 4 or 5 position (or several of these positions) of the thiazole ring as shown here by the structural formula:

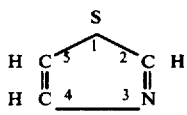

Suitable thiazoles include thiazole, 2-mercaptothiazole, 2-mercaptobenzothiazole, benzothiazole, and the like.

In the above azole compounds, the constituents substituted in the azole rings can be alkyl, aryl, aralkyl, alkylol, and alkenyl radicals so long as the substituted azole is water-soluble.

To illustrate a typical formula of the invention, Composition 1 is set forth below:

| Composition 1 | |
|---|---|
| Ingredients | % by Weight |
| Phosphated-Ethoxylated Glycerine[1] | 6.0 |
| Tolyl Triazole | 1.0 |
| Polyphosphate Glass | 6.25 |
| Alkali water, alcohol | 82.15 |

[1]See Example 1, U.S. 3,728,420, for general mode of preparation and Composition Compositions such as Composition 1 are effective as scale and corrosion inhibitors under the conditions previously described when used at dosages as low as 0.1 up to as high as 100 ppm based on the active ingredients contained therein. In most cases, good results are achieved when the dosage is within the range of 1-10 ppm. These dosages may be varied. For instance, when the treatments are initially started, higher dosages are sometimes used to initially form protective films and the like and are then reduced to provide a so-called maintenance level, which are the dosages previously described above.

The test apparatus used in all the examples set forth hereinafter is a pilot cooling tower laboratory unit.

The pilot cooling tower (PCT) is quite flexible in its operation. The variables of heat flux, metallurgy, flow rate, pH, chemical feed rate, biocide program, holding time index, cycles of concentration, and make-up water analysis contribute to making this unit extremely valuable for many kinds of testing. Water is pumped from the tower basin by a variable speed pump through PVC piping from which a side stream is taken and passed through an electrical conductivity cell (sensor cell) and returned to the tower basin. The conductivity of the recirculating water as measured by the conductivity cell is compared to a set point. If the conductivity of the water is too high, the blowdown pump begins removing tower basin water at the rate of 70 ml/min. The chemical feed pump is activated simultaneous to the blowdown pump and begins adding fresh chemical at such a rate to provide the desired dosage based on blowdown water removed. Since the tower basin level is being lowered, a level controller activates the make-up selenoid and fresh make-up replaces the concentrated blowdown water thus reducing the overall conductivity of the recirculating water. The above explained mechanism accounts for the basic cooling tower variables of make-up, cycles of concentration, holding capacity, holding time index and calculated continuous blowdown rate.

Beyond the conductivity cell lies an in-line metallic thermometer which basically indicates the basin temperature. The basin temperature, however, can be regulated by an adjustable screw on the outside of a thermal sensor which protrudes into the tower basin. Beyond a given water temperature this sensor activates the exhaust fan at the top of the tower and the counterflow induced draft provides the extra cooling needed to provide the desired basin temperature. With no fan cooling standard heat load, and normal recirculation rate, the basin temperature can reach 118° F.

An in-line rotometer indicates flow in gpm. This flow can be regulated at the variable speed pump which has a range of 0-3 gpm.

The pH of the system is monitored by pH electrodes which are in series with a Great Lakes pH analyzer. The pH analyzer has high set point capability. Beyond this high set point, the acid selenoid is activated and a dilute solution of sulfuric acid is fed until the pH becomes lower than the set point pH. Hysteresis can also be regulated.

After having seen pH electrodes, the water travels shellside on three heat transfer surfaces which can be of varying metallurgy. These tube specimens are generally admiralty brass unless corrosion of mild steel heat transfer surfaces is an objective of the test. The heat flux is provided by cartridge heaters of a given wattage. The desired heat flux may be gained by rheostating the heaters to the desired power output. Mild steel corrosion coupons sit mounted in lucite blocks beyond the heat transfer tubes. These latter specimens provide non-heat transfer corrosion and deposit results. Again, these coupons can be of various metallurgies but mild steel is most commonly employed since the majority of metal transmission lines are mild steel. The water then passed a magna corrater probe which can provide daily readout. The above discussed section of the unit provides the necessary information for performance on the metal surfaces for a given program.

The water then moves to a water distribution (closed deck) system and falls down honey combed PVC tower fill and into the basin where the recirculation process recurs.

EXAMPLES

In each test sequence, a high level dosage is maintained for two days. During this high level dosage, 25 ppm polyphosphate as $PO_4$ (200 ppm Composition 2 or 420 ppm Composition 1) are fed, pH control is maintained at 8.0 and cycles of concentration are maintained near 2.0. This is done to establish maximum polyphosphate corrosion protection while minimizing the possibility of calcium phosphate deposition. Maintaining pH=8.0 keeps orthophosphate mainly in the more soluble $HPO_4\!\!=\!\!$form and maintaining low cycles of concentration keeps a high chemical turnover. Collectively, these two methods of operation can reduce or eliminate scaling due to hydrolytic reversion of the polyphosphate. The mode of operation changes slightly for the intermediate high level dosage of 12.5 ppm polyphosphate as $PO_4$ (100 ppm Composition 2 or 210 ppm Composition 1). Generally, no pH control is used and 2.5 cycles of concentration are maintained. The low level dosage (40 ppm Composition 2 and 84 ppm Composition 1) is fed for the ten to twelve days following high level. This is considered more than enough time for the high level effects to wear off. The evaluation, therefore, truly reflects the performance of a low level dosage operation after effective high-leveling.

When testing both Composition 2 and Composition 1, analysis of the recirculating water is quite important. Water variables such as calcium hardness, total hardness, phenophthalein alkalinity, methyl orange alkalinity, conductivity and pH are done on a daily basis. In addition, the levels of soluble orthophosphate, soluble polyphosphate and soluble organic phosphate are monitored by spectrophotometric techniques. The amount of analyzed organic phosphate is related back to the amount of polyol ester (POE) in the formula composition and is recorded in terms of ppm Composition 2 or ppm Composition 1. The test sequences described in this report discuss the parameters of pH, calcium hardness, holding time index, and basin temperature in a specific manner. Other factors which are held constant or which are not believed to significantly affect the overall comparison are flow velocity, conductivity, suspended solids, total microbiological count, silica concentration, time required to recirculate a volume of water equal to the holding capacity, extensive use of PVC piping rather than metal, and the use of synthetic tower fill. Fouling due to suspended solids absorption and micro-organism absorption can confuse the evaluation of corrosion and deposit control. An effort is made to factor out their influence by using make-up water with essentially no turbidity and in the case of microorganisms by adding enough bleach to maintain total counts below $1 \times 10^6$ organisms/ml (normally a 10 ppm NaOCl slug per day). Flow velocity is 2.5–3.0 ft/sec in every test sequence and, therefore, exerts no influence when comparing one test sequence to another.

All metal specimens are dry-weighed prior to the test, after the test is completed and after all deposit is removed by inhibited hydrochloric acid. The results of each test are computed as follows:

Corrosion weight = initial weight − final weight
Deposit weight = pre-clean weight − final weight
Corrosion rate (MPY) =
$$\frac{\text{area factor for metal} \times \text{corrosion weight}}{\text{days exposure}}$$

The corrosion weights and deposit weights are reported in milligrams. When two metal specimens are used, the weight is reported as the average. Corrosion rate is in mils per year and is also reported as an average when two specimens are used.

The desired maintenance level of a condensed phosphate is 5 ppm as $PO_4$. A dosage of 40 ppm of Composition 2 will feed 8.68 ppm of potassium pyrophosphate or 5.0 ppm as $PO_4$. Similarly, 84 ppm of Composition 1 will feed 5.735 ppm of the phosphate glass or 4.9 ppm as $PO_4$. In both compositions, essentially the same amount of polyol ester (8.5 ppm) will be fed by each composition at use level. The polyol ester (POE) is included for $CaCO_3$ scale control. It has some benefit as a mild steel corrosion inhibitor but not enough to where the POE could be used singularly to control mild steel corrosion. The benzotriazole (BZT) and tolyltriazole (TT) are copper corrosion inhibitors. They are both effective in controlling corrosion of copper and its alloys at levels of 0.7 ppm to 0.8 ppm in open recirculating systems.

The standard PCT test (Test Sequence A) is conducted under what would be considered mild conditions for these critical cooling water parameters: basin temperature=100° F.; holding time index≃10 hours; calcium hardness≃250 in the recirculating water; pH≃8.8 at maintenance level. Changing these parameters to a more stressed operating condition in later test sequences can easily be related back to Sequence A.

Test Sequence A: Standard Conditions

Both Composition 2 and Composition 1 give good results under the standard test conditions. Experience in operating PCT's would suggest that a 14 day mild steel heat transfer (tube specimen) corrosion rate of 3.0 or lower is quite good. Mild steel deposit weights in the 350 mg to 500 mg range would be rated as good deposit control. Any measurement below 350 mg would be considered excellent. For admiralty brass heat transfer surfaces, a deposit weight of 75 mg to 100 mg would be considered good. Any deposit weight below 75 mg would, of course, be considered excellent.

Table I shows a tabulation of the actual PCT operating conditions for Test Sequence A and the Corrosion and Deposit Results from this sequence.

scription indicates that both scale and corrosion product were on the heat transfer surfaces. Composition 1, however, gave excellent results on both mild steel and admiralty brass tubes. The final tube description confirmed the absence of any scale with Composition 1. Admiralty corrosion rates are not considered a criterion for success or failure in this study. High admiralty corrosion rates will result from heat transfer surface scaling. The presence of scale is accounted for by the tube description and deposit weight. The corrosion rate of the admiralty heat transfer surface, therefore, provides little added information in comparing the performance of the two treatments. The admiralty brass corrosion rate will be reported but will not be discussed. The overall performance of Composition 1 is better than Composition 2 under standard conditions since it is rated excellent in both corrosion and deposit control. The Composition 2 deposit control is marginal.

TABLE I

TEST SEQUENCE A
PCT OPERATING CONDITIONS

| | Make-up Water | High Level Dose PPM | Low Level Dose PPM | Bio-cide | Basin Temp °F. | Avg. System pH | Avg. Calcium Hardness | Avg. Magnesium Hardness | Avg. Conc. Ratio | Calculated Holding Time Index |
|---|---|---|---|---|---|---|---|---|---|---|
| COMP. 2 | Chicago Tap | 100 | 40 | bleach | 100° F. | 8.8 | 245 | 141 | 2.7 | 9.4 |
| COMP. 1 | Chicago Tap | 210 | 84 | bleach | 100° F. | 8.8 | 217 | 126 | 2.4 | 8.0 |

CORROSION AND DEPOSIT RESULTS

| | Test Duration | Mild Steel Heat flux | Avg. ms Tube Corr. Rate | Avg. ms Tube Corr. mg. | Avg. ms Tube Dep. mg. | Admiralty Heat flux | ADM Corr. Rate | ADM Corr. mg. | ADM Dep mg. | Avg. ms coupon Corr Rate | Heat trans. Tube desc. |
|---|---|---|---|---|---|---|---|---|---|---|---|
| COMP. 2 | 14 days | 10,000 | 2.44 | 325 | 541 | 10,000 | 0.34 | 46 | 124 | 3.6 | scale, local attack ADM dezincification. |
| COMP. 1 | 14 days | 10,000 | 1.23 | 165 | 171 | 10,000 | 0.40 | 54 | 60 | 0.73 | No scale, surface etch. |

The average system pH, for example, is calculated by averaging the daily pH from day 4 to the end of the test or day 14 in this case. Average calcium hardness and average magnesium hardness are calculated in the same way. The average concentration ratio is computed by dividing the average magnesium hardness by the magnesium hardness in the make-up water. Make-up water analyses can also be found in the Appendix. The holding time index is calculated using standard cooling water calculations.

It can be seen from Table I that both Composition 2 and Composition 1 give mild steel heat transfer corrosion rates of less than 3.0. Using the performance guidelines set down in this section, these results would be considered quite good.

The deposit weight on mild steel surfaces is the sum of iron oxide corrosion product, plus mineral salt scales. The suspended solids level in all test sequences is very low and, therefore, does not contribute to deposit weight. Admiralty heat transfer deposit weights are composed only of mineral salt scales. Rarely will corrosion product ever make up a significant percentage of the admiralty deposit weight. The deposit control of Composition 2 is only fair on both mild steel and admiralty heat transfer surfaces. The heat transfer tube de-

Test Sequence B: pH Control at 8.0

Controlling the recirculating water pH at 8.0 eliminates the possibility of calcium carbonate and calcium phosphate scaling, but at the same time increases the corrosivity of the recirculating water. Test Sequence B then is a direct comparison of the phosphate glass and potassium pyrophosphate (KPP) in their ability to inhibit mild steel corrosion. Table II shows the results of this comparison.

TABLE II

TEST SEQUENCE B
PCT OPERATING CONDITIONS

| | Make-up Water | High Level Dose PPM | Low Level Dose PPM | Biocide | Basin Temp. °F. | Avg. System pH | Avg. Calcium Hardness | Avg. Magnesium Hardness | Avg. Conc. Ratio | Calculated Holding Time Index |
|---|---|---|---|---|---|---|---|---|---|---|
| COMP. 2 | Chicago Tap | 200/100 | 40 | bleach | 100° F. | 8.0 | 250 | 139 | 2.8 | 10.0 |
| COMP. 1 | Chicago Tap | 420/210 | 84 | bleach | 100° F. | 8.0 | 278 | 154 | 3.1 | 11.5 |

CORROSION AND DEPOSIT RESULTS

| | Test | Mild Steel | Avg. ms Tube Corr. | Avg. ms Tube | Avg. ms Tube | Admiralty | ADM Corr. | ADM Corr. | ADM | Avg. ms coupon | Heat trans. |
|---|---|---|---|---|---|---|---|---|---|---|---|

TABLE II-continued

|  | Duration | Heat flux | Rate | Corr. mg | Dep. mg. | Heat flux | Rate | mg. | Dep mg | Corr Rate | Tube desc. |
|---|---|---|---|---|---|---|---|---|---|---|---|
| COMP. 2 | 14 days | 10,000 | 9.82 | 1303 | 1731 | 10,000 | 1.74 | 226 | 281 | 9.8 | Moderate surface etch |
| COMP. 1 | 16 days | 10,000 | 4.54 | 701 | 742 | 10,000 | 0.68 | 102 | 74 | 1.67 | No scale, spot attack w/depth |

The phosphate glass is a much better mild steel corrosion inhibitor than potassium pyrophosphate. The corrosion rate on mild steel heat transfer surfaces increased for both treatments by a factor of ~3.5. The increase in corrosion rate may be due to increased reversion rate to ineffective orthophosphate, loss of bicarbonate buffering capacity, and the loss of any corrosion inhibition assistance from polyol ester which is known to be of little or no value below pH=8.5. Despite the fact that a double dose/double time high level start-up was used, there is evidence of slight under-dosage with Composition 1. The tube description indicates local attack, and the corrosion rate is somewhat higher than 3.0 mils per year (MPY). This is normally an indication that the critical potential for passivation is approached but not exceeded because of insufficient passivator[1]. Since good high leveling was achieved, a maintenance dosage greater than 84 ppm will be needed to achieve a 14 day corrosion rate <3.0 MPY on mild steel with Composition 1 under these conditions. Composition 2 mild steel tubes show a more general attack accompanied by a very high corrosion rate. This −9.8 MPY result indicates gross under-dosage at maintenance level for Composition 2.

[1]Principles of Corrosion and Protection, D. Stewart and D. S. S. Tullock, MacMillan (1968) p.81-82.

In summary, the use of Composition 1 in lieu of Composition 2 under pH=8.0 control conditions is advantageous because less chemical will be required to achieve best results.

Test Sequence C: High Temperature; Longer Holding Time

Increasing the basin temperature and lengthening the holding time index will accentuate the hydrolytic instability of polyphosphates. Better results of Composition 1 are still obtained (See Table III).

TABLE III

TEST SEQUENCE C
PCT OPERATING CONDITIONS

|  | Make-up Water | High Level Dose PPM | Low Level Dose PPM | Biocide | Basin Temp °F. | Avg. System pH | Avg. Calcium Hardness | Avg. Magnesium Hardness | Avg. Conc. Ratio | Calculated Holding Time Index |
|---|---|---|---|---|---|---|---|---|---|---|
| COMP. 2 | Chicago Tap | 200/100 | 40 | bleach | 113° F. | 8.8 | 225 | 170 | 2.8 | 20.0 |
| COMP. 1 | Chicago Tap | 420/210 | 84 | bleach | 116° F. | 8.8 | 250 | 145 | 2.8 | 20.0 |

CORROSION AND DEPOSIT RESULTS

|  | Test Duration | Mild Steel Heat flux | Avg. ms Tube Corr. Rate | Avg. ms Tube Corr. mg. | Avg. ms Tube Dep. mg. | Admiralty Heat flux | ADM Corr. Rate | ADM Corr. mg. | ADM Dep mg | Avg ms coupon Corr Rate | Heat trans. Tube desc. |
|---|---|---|---|---|---|---|---|---|---|---|---|
| COMP. 2 | 16 days | 10,000 | 3.07 | 473 | 1340 | 10,000 | 0.36 | 60 | 238 | 3.9 | brown scale, general attack |
| COMP. 1 | 16 days | 10,000 | 0.77 | 120 | 182 | 10,000 | 0.18 | 30 | 51 | 0.7 | No scale, light spot attack |

This is largely a function of the startup procedure which holds pH=8.0 and the concentration ratio at 2.0 cycles. The increased solubility of the orthophosphate anion at pH=8.0 reduces the driving reaction force caused by calcium orthophosphate precipitation and lower cycles of concentration reduce the exposure time. These account for the higher polyphosphate residuals seen for Composition 1 during the first six days of the test and ultimately for the better corrosion protection. Table III is a summary of conditions and the results of this testing. Composition 1 is superior with respect to both corrosion protection and deposit control. A deposit weight of 1340 mg on the mild steel tube and 238 mg on the admiralty tube for the Composition 2 test, however, is quite poor. This deposit is largely a result of losing chemical mass balance based on cycles of calcium hardness and cycles of M alkalinity relative to cycles of magnesium hardness. This ion imbalance was not seen for Composition 2 in Test Sequence A despite a similar concentration ratio. This loss of calcium carbonate stabilization is probably related to the increased basin temperature. Composition 1 does not experience this loss of activity and as a result gives excellent deposit control.

Test Sequence D:

High Temperature; Longer Holding Time; High Calcium

Test Sequence D is very similar to Test Sequence C. The basin temperature is lowered somewhat: 113° F. to 110° F. and 116° F. to 111° F. The major difference, however, is the amount of calcium hardness in the recirculating water. In Test Sequence D, it is in the 650 ppm to 700 ppm range while Test Sequence C had the standard 225 ppm to 250 ppm. Table IV summarizes the conditions and results.

sition 1. The effect of lignosulfonate is not known. Some preliminary work should be done to determine if any benefits can be derived from the combination of lignosulfonate, Composition 2 and Composition 1.

TABLE IV

TEST SEQUENCE D
PCT OPERATING CONDITIONS

|  | Make-up Water | High Level Dose PPM | Low Level Dose PPM | Biocide | Basin Temp °F. | Avg. System pH | Avg. Calcium Hardness | Avg. Magnesium Hardness | Avg. Conc. Ratio | Calculated Holding Time Index |
|---|---|---|---|---|---|---|---|---|---|---|
| COMP. 2/ Lignosulfonate | Water A | 110 21 | 45 21 | bleach | 110° F. | 8.6 | 703 | 248 | 4.2 | 20.5 |
| COMP. 1/ Lignosulfonate | Water A | 420/210 29 | 84 21 | bleach | 111° F. | 8.2 | 638 | 244 | 3.8 | 18.0 |

CORROSION AND DEPOSIT RESULTS

|  | Test Duration | Mild Steel Heat flux | Avg. ms Tube Corr. Rate | Avg. ms Tube Corr. mg. | Avg. ms Tube Dep. mg. | Admiralty Heat flux | ADM Corr. Rate | ADM Corr. mg. | ADM Dep mg | Avg ms coupon Corr Rate | Heat trans. Tube desc. |
|---|---|---|---|---|---|---|---|---|---|---|---|
| COMP. 2 | 14 days | 10,000 | 8.8 | 1170 | 1830 | 10,000 | 0.38 | 52 | 200 | 11.2 | scale, severe local attack; dezincification. |
| COMP. 1 | 12 days | 10,000 | 1.53 | 170 | 220 | 10,000 | 0.31 | 39 | 55 | 1.13 | light spot attack, no scale. |

The comparison is not as clear as in other test sequences. Composition 2 did not see a 25 ppm polyphosphate high level and the Composition 2 program was operated at an average pH=8.6 causing the M alkalinity to be an average of 75 ppm higher than in the Composition 1 experiment. There are some interesting observations nevertheless. The average polyphosphate residual at maintenance level is higher for both products than in test Sequence C averaging 1.9 ppm as PO$_4$ for Composition 2 and 2.2 ppm as PO$_4$ for Composition 1. This higher residual is attributed to a lower basin temperature. The holding time indices were the same in Test Sequence C as they were in Test Sequence D.

The corrosion protection and deposit control of Composition 1 are both excellent. This further demonstrated the excellent performance of Composition 1 under conditions that would be expected to degrade the performance of an alkaline polyphosphate program. Composition 2 does poorly in corrosion protection and deposit control. This may be partially a result of failure to high-level at both 200 ppm and 100 ppm, but in consideration of Test Sequence C, Composition 2 would still be expected to be much less effective than Composition 1.

Test Sequence E:

Higher Temperature; Longer Holding Time; High Calcium

This Test Sequence is similar to both Sequences C and D. The observation that average polyphosphate residual is a function of basin temperature appears to apply to this sequence as well: Polyphosphate Residuals vs. Basin Temperature.

|  | A 100° F. | D 110° F. | C 113° | E 117° |
|---|---|---|---|---|
| Composition 2 | 2.9 ppm | 1.9 ppm | 1.6 ppm | —* |
| Composition 1 | 4.8 ppm | 2.2 ppm | 1.3 ppm (116°) | 0.3 ppm |

*not enough data

Unlike Sequences C and D, Composition 1 shows a mild steel tube corrosion rate above the 3.0 MPY (Table V).

TABLE V

TEST SEQUENCE E
PCT OPERATING CONDITIONS

|  | Make-up Water | High Level Dose PPM | Low Level Dose PPM | Biocide | Basin Temp °F. | Avg. System pH | Avg. Calcium Hardness | Avg. Magnesium Hardness | Avg. Conc. Ratio | Calculated Holding Time Index |
|---|---|---|---|---|---|---|---|---|---|---|
| COMP. 2 | Water B | 200 | 40 | bleach | 117° F. | 8.4 | 566 | 232 | 3.3 | 15.0 |
| COMP. 1 | Water B | 420 | 84 | bleach | 117° F. | 8.7 | 656 | 308 | 4.6 | 24.0 |

CORROSION AND DEPOSIT RESULTS

| Test Duration | Mild Steel Heat flux | Avg. ms Tube Corr. Rate | Avg. ms Tube Corr. mg. | Avg. ms Tube Dep. mg. | Admiralty Heat flux | ADM Corr. Rate | ADM Corr. mg. | ADM Dep mg | Avg ms coupon Corr Rate | Heat trans. Tube desc. |
|---|---|---|---|---|---|---|---|---|---|---|

TABLE V-continued

| | | | | | | | | | | | |
|---|---|---|---|---|---|---|---|---|---|---|---|
| COMP. 2 | 8 days | 5,000 | 18.4 | 1228 | 2760 | 15,000 | 3.2 | 213 | 164 | — | scale,gen corrosion |
| COMP. 1 | 14 days | 5,000 | 4.0 | 535 | 1063 | 15,000 | 0.45 | 59 | 846 | 2.3 | soft scale, light surface attack. |

The combination of operating conditions that caused this deviation from previously seen excellent results is 24 hours holding time index, 117° F. basin temperature, and an average of 650 ppm calcium hardness in the recirculating water. The deposit weight increased along with the corrosion rate. The scale is composed of calcium phosphate scale and iron oxide. The presence of scale is caused by reversion by the polyphosphate to the ineffective orthophosphate ion. The results for Composition 2 are poor. Deposit weights averaging 2760 mg in only eight days are beyond explanation. The corrosion rate of 18.4 MPY after eight days would be less after 14 days but still three to four-fold higher than with Composition 1.

Test Sequence F:

Longer Holding Time; Very Low Calcium

A very soft water was used in this sequence. When concentrated, this water produced calcium hardnesses in the 35–45 ppm range. This change produced the largest increase in mild steel corrosion rate of any of the variables tested. Since the P alkalinity was normally 10 or below (see Table VI), the potential for scale formation was nil.

dosage to maintenance levels caused a dramatic rise in corrosion rate. Obviously, the maintenance dosage must be higher for both products. The Composition 1 test would be visually rated as excellent at 400 ppm and 200 ppm product fed. The Composition 2 test would be rated visually as fair at 100 ppm product fed.

Having thus described my invention, it is claimed as follows:

1. A composition for preventing scale and corrosion in industrial cooling water systems which comprises (I) a water-soluble alkali metal condensed phosphate glass which has an average molecular weight of about 2160 and a $PO_4$ content of 92.4% by weight and (II) a phosphated glycerol which has been reacted with from 1.5–2.5 moles of ethylene oxide per mole of glycerol, with the weight ratio of I:II being about 1:1.

2. The composition of claim 1 wherein it additionally contains from 3–15% by weight of a water-soluble azole from the group consisting of 1,2,3-triazoles, pyrazoles, imidazoles, isoxazoles, oxazoles, isothiazoles, thiazoles and mixtures thereof.

3. A method of inhibiting scale and corrosion in industrail cooling waters which comprises treating said

TABLE VI

TEST SEQUENCE F
PCT OPERATING CONDITIONS

| | Make-up Water | High Level Dose PPM | Low Level Dose PPM | Biocide | Basin Temp °F. | Avg. System pH | Avg. Calcium Hardness | Avg. Magnesium Hardness | Avg. Conc. Ratio | Calculated Holding Time Index |
|---|---|---|---|---|---|---|---|---|---|---|
| COMP. 2 | Water C | 100 | 40 | R & H 886 | 100° F. | 8.5 | 32 | 19 | 4.5 | 19.0 |
| COMP. 1 | Water C | 420/210 | 84 | R & H 886 | 100° F. | 8.5 | 47 | 22 | 4.7 | 20.0 |

CORROSION AND DEPOSIT RESULTS

| | Test Duration | Mild Steel Heat flux | Avg. ms Tube Corr. Rate | Avg. ms Tube Corr. mg. | Avg. ms Tube Dep.mg. | Admiralty Heat flux | ADM Corr. Rate | ADM Corr. mg. | Avg ADM Dep mg | ms coupon Corr Rate | Heat trans. Tube desc. |
|---|---|---|---|---|---|---|---|---|---|---|---|
| COMP. 2 | 14 days | 10,000 | 54.8 | 7522 | 7856 | 10,000 | 4.6 | 611 | 246 | 55.5 | severe surface attack. |
| COMP. 1 | 14 days | 10,000 | 22.2 | 2940 | 4035 | 10,000 | 0.38 | 42 | 50 | 17.6 | severe general attack |

Both products showed severe general corrosion attack. The corrosion rated observed were approximately a twelve-fold increase over that observed for standard conditions. Despite the poor results for both products, the daily tube observations indicated that both products had fair to excellent control at high level. Reduction of waters with at least 0.1 ppm of the composition of claim 1.

4. The method of claim 3 wherein the industrial cooling water has a pH of 8–9 and an average temperature greater than 110° F.

* * * * *